UNITED STATES PATENT OFFICE.

OTTO DEGNER, OF ELBERFELD, GERMANY, ASSIGNOR TO FARBENFABRIKEN OF ELBERFELD CO., OF NEW YORK, N. Y., A CORPORATION OF NEW YORK.

FATTY COMPOUND OF IODIN AND SULFUR AND PROCESS OF MAKING SAME.

SPECIFICATION forming part of Letters Patent No. 696,900, dated April 1, 1902

Application filed December 21, 1901. Serial No. 86,828. (Specimens.)

*To all whom it may concern:*

Be it known that I, OTTO DEGNER, doctor of philosophy, chemist, residing at Elberfeld, Germany, (assignor to the FARBENFABRIKEN OF ELBERFELD CO., of New York,) have invented a new and useful Improvement in a Fatty Compound of Iodin and Sulfur and Process of Making the Same, of which the following is a specification.

Fats containing in their molecule sulfur and iodin have not been known up to this day. I have now succeeded in finding a process for preparing such bodies. This process consists in at first treating with iodin and hydrogen sulfid fats, such as sesame-oil, poppy-oil, olive-oil, bacon-fat, oleic acid, or the like; secondly, purifying the reaction mass, and, thirdly, isolating the resulting new bodies. I point out distinctly that under the name "fats" I mean fats, fatty oils, unsaturated fatty acids, or the like.

The new bodies obtainable by means of my new process are oily liquids more or less colored which are soluble in benzene, ether, and ligroin. They do not split off iodin on being heated on the water-bath and can be kept long without decomposition. Owing to the fact that iodin and sulfur are intimately combined with the fatty molecule, they exhibit no irritating action on the mucous membranes. Nevertheless the valuable action of iodin and sulfur therein is not diminished. For this reason the new compounds can profitably be used in medicine, an average dose being from two to five grams, according to the percentage of iodin and sulfur contained therein.

In carrying out my new process practically I can proceed as follows, the parts being by weight: Twenty-five parts of iodin are introduced into a solution of fifty parts of sesame-oil in fifty parts of benzene. Into the resulting mixture hydrogen sulfid is introduced until a clear and colorless solution results. By repeated washing with water and alcohol the reaction mass is freed from an excess of hydrogen sulfid and iodin. The solution is then gently heated *in vacuo* in order to remove the benzene still contained therein. The resulting new body represents a yellowish-brown oil containing about thirty per cent. of iodin and three per cent. of sulfur. It is soluble in ether, benzene, and ligroin with a yellowish color. The iodin and sulfur contained therein are so intimately combined with the molecule that they cannot be discovered by means of the usual agents. On heating the new body over a free flame it is decomposed, violet vapors of iodin being disengaged. It can be used in medicine either directly or diluted with sesame-oil or the like.

The process proceeds in an analogous manner if others of the above-mentioned fatty compounds be used.

On employing other proportions of iodin and hydrogen sulfid bodies containing another percentage of iodin and sulfur can be obtained.

Having now described my invention and in what manner the same is to be performed, what I claim as new, and desire to secure by Letters Patent, is—

1. The process for producing new derivatives of fats containing sulfur and iodin, which process consists in at first treating fats with iodin and hydrogen sulfid, secondly purifying the reaction mass and thirdly isolating the new compounds, substantially as hereinbefore described.

2. The process for producing a new derivative of sesame-oil containing iodin and sulfur, which process consists in at first treating sesame-oil with iodin and hydrogen sulfid, secondly purifying the reaction mass and thirdly isolating the new compound, substantially as hereinbefore described.

3. The herein-described new derivatives of fats containing in the molecule iodin and sulfur being more or less colored oily liquids soluble in benzene, ether and ligroin which do not split off iodin when heated on the water-bath and being valuable remedies, substantially as described.

4. The herein-described specific derivative of sesame-oil containing iodin and sulfur being a yellowish-brown oil soluble in benzene, ether and ligroin with a yellowish color, iodin and sulfur being so intimately combined therein with the molecule that they cannot be discovered by means of the usual agents, being decomposed when heated over a free flame with disengagement of violet vapors of iodin and representing a valuable remedy, substantially as hereinbefore described.

In testimony whereof I have signed my name in the presence of two subscribing witnesses.

OTTO DEGNER.

Witnesses:
OTTO KÖNIG,
T. A. RITTERSHAUS.